W. V. LANDER.
ART OF TREATING WOOD AND OTHER POROUS MATERIAL.
APPLICATION FILED FEB. 19, 1920.

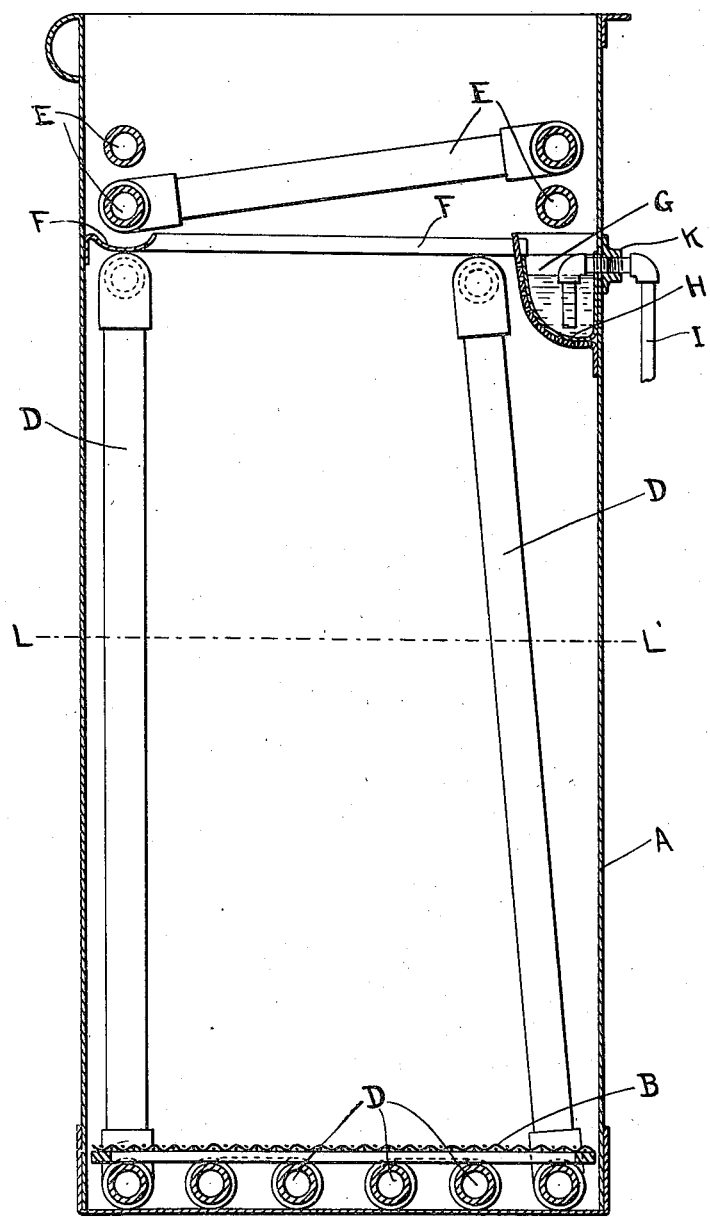

1,429,288.

Patented Sept. 19, 1922.
2 SHEETS—SHEET 2.

Inventor
Wintworth V. Lander
by Roberts Roberts & Cushman
Att'ys

Patented Sept. 19, 1922.

1,429,288

UNITED STATES PATENT OFFICE.

WINTWORTH V. LANDER, OF NEWTON, MASSACHUSETTS.

ART OF TREATING WOOD AND OTHER POROUS MATERIAL.

Application filed February 19, 1920. Serial No. 359,788.

*To all whom it may concern:*

Be it known that I, WINTWORTH V. LANDER, a citizen of the United States, and resident of Newton, in the county of Middlesex and State of Massachusetts, have invented new and useful Improvements in the Art of Treating Wood and Other Porous Material, of which the following is a specification.

This invention relates to the art of filling and impregnating bodies characterized by porous or interstitial structure and which are therefore bibulous, and comprises improvements and additions to the inventions covered by my prior patents and applications: Patent No. 1,277,322; Pat. No. 1,278,943; Serial No. 247,662; Ser. No. 247,663; and Ser. No. 247,664.

The bodies or substances which are susceptible of treatment by the apparatus herein disclosed are exemplified by compressed wood-pulp articles, such as pulp-board, pails, wood-pulp articles, such as pulp-board, pails, toilet-seats, etc., by wooden articles such as wooden blocks, bobbins, etc., and also flexible sheet materials such as paper, textiles, paper-board, leather board, and leather, all of which are characterized by interstitial structure and capable of taking up a liquid by capillary absorption. The present apparatus may be employed to impregnate these and other articles either superficially or through and through.

The principal object of the invention is to render porous or bibulous bodies impervious or resistant to water by reason of the increased or enhanced internal structural continuity imparted to such bodies by my improved process of impregnation. A further object of the invention is a method of regulating the degree of impregnation or the quantity of impregnating material distributed uniformly or otherwise, within the body.

The invention will now be described in connection with one illustrative species only of the genus of the invention.

In the accompanying drawings,—

Fig. 1 is a vertical transverse section of the preferred embodiment of an apparatus useful in carrying the process into effect;

Figure 3:
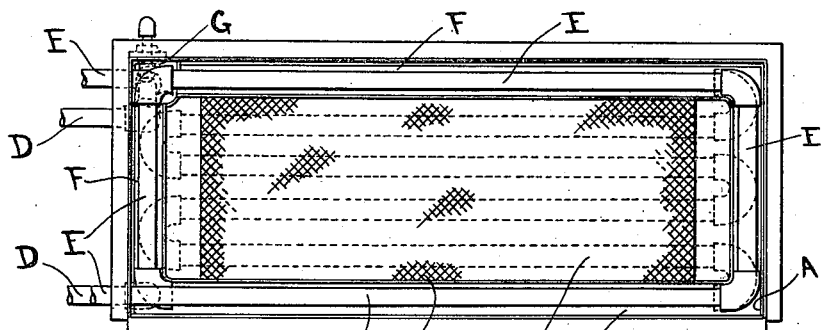
Fig. 3 is a top plan view of the apparatus.
Figure 4:
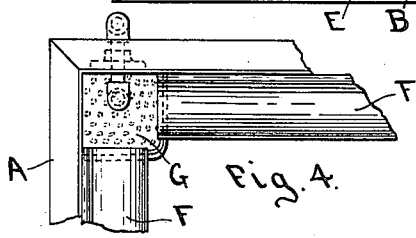
Fig. 4 is a detail of a portion of the apparatus showing a filtering chamber for filtering out the condensed carrier from the moisture driven from bodies immersed in the apparatus.
Figure 2:
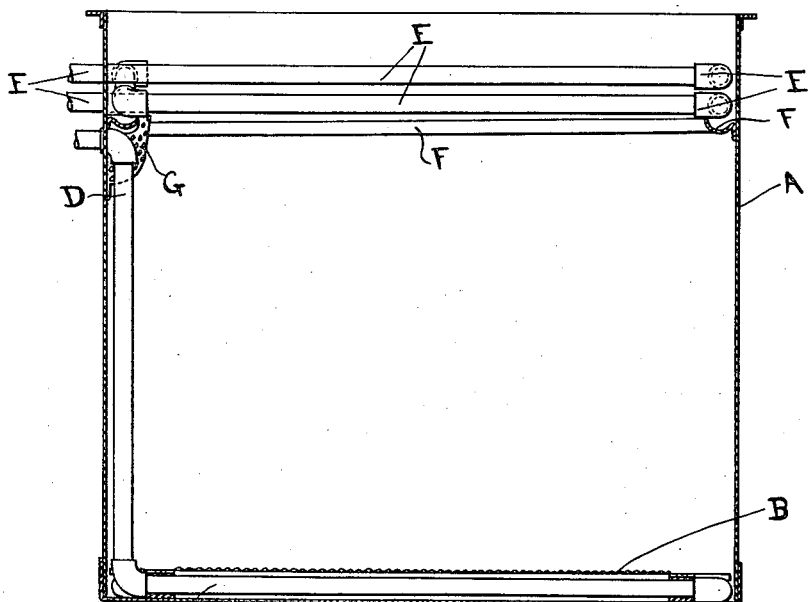
Fig. 2 is a vertical longitudinal section of said apparatus.

The impregnating composition which is preferably employed in the improved method comprises crude petrolatum and rosin dissolved in a carrier of gasoline, although it will of course be understood that the method may be employed with any suitable composition. When using crude petrolatum and common resin dissolved in gasoline, the gasoline serves as a volatile carrier to carry the mixture of petrolatum and rosin into the material to be impregnated and is then removed by evaporation. For wooden articles or materials of similar nature which need not be maintained flexible, an impregnating composition comprising 20% resin, 20% petrolatum and 60% gasoline by weight has been found to be very satisfactory. By decreasing the percentage of resin and increasing the percentage of petrolatum a composition suitable for rendering the treated materials more pliable and soft is obtained. By varying the proportions of the volatile carrier and the impregnating material it becomes possible to control the relative density of impregnating material and the body material or, in other words, the amount of impregnating material distributed within the pores of the body, and this distributing may be made uniform by completely saturating the body. This follows because complete saturation is obtained when an amount of liquid is absorbed that completely fills the pores irrespective of its constitution. If the volatile matter form a relatively large proportion of this absorbed liquid evidently a small amount of the impregnating material remains; regulation of the proportion of volatile matter to impregnating material then controls the amount of material deposited.

In the accompanying drawings, A represents a tank (which may be galvanized iron) about two feet wide, five feet high, and as long as the nature of the work requires. Heating pipes D, for steam or other heating agent, lie at the bottom of the tank A, and a perforated or wire-mesh screen B is placed over these pipes to prevent the material under treatment from touching the hot pipes and also to hold the material being treated off the bottom of the tank and afford free access of the liquor to the under surface of the material. Near the upper edge of the tank A and adjacent to the sides thereof there is a coil of pipe E, through which a cooling fluid is circulated so as to supplement the cooling and condensing effect of the upper portion of the walls of the tank A. Attached to the side walls of the tank A immediately beneath the coil of pipe E and extending entirely around the inside of the tank is a trough F. The trough is so inclined relative to the top of the tank that its lowest portion is disposed at one corner of the tank and communicates with the filter chamber G, so that liquids of condensation will be drained into the chamber G.

The filter chamber G is perforated as most clearly shown in Fig. 1 and lined with a pocket of chamois H. Communicating with the chamber G is a siphon pipe I which is secured in the wall of tank A by means of a threaded flange K. The siphon pipe I extends nearly to the bottom of the chamber G so that the liquid which settles to the bottom of the filter chamber is drawn off through the siphon.

The tank is filled to the level L, L', for example, with the crude petrolatum, resin, gasoline composition, and steam or other suitable heating medium is circulated through the pipes D, causing the composition to boil. The vapor generated rises in the tank, is condensed on the walls of the tank or on the surfaces of the cooling coils E and falls into the trough F by means of which it is drained into the filter chamber G and trickles through the openings therein down the sides of the tank. The effect of the condensation is to keep gasoline vapors from escaping into the room, in which although gasoline is being boiled in an open vessel, there will be hardly a noticeable gasoline odor.

In treating blocks of wood such as bobbins they may conveniently be placed on end in a reticulated basket or tray and lowered into the tank until their lower ends are immersed in the boiling composition. The composition will gradually rise in the blocks driving the moisture and sap from the upper ends of the blocks. As fast as impregnation of the lower immersed ends of the blocks becomes complete the baskets are gradually lowered in the tank. For treating wood the best results are attained by maintaining the composition at a temperature between 170° and 190° Fahrenheit.

The sap or moisture driven from the blocks is in the form of vapor which mingles with the gasoline vapor and rises in the tank where it becomes condensed and flows into the filter chamber G. In accordance with its well-known property the gasoline floats upon the surface of the water of condensation in the chamber G, filters through the chamois H and trickles down the sides of the tank uniting with the liquid composition in the bottom of the tank. The water, which will not pass through the chamois filter, is retained within the chamber G from which it is siphoned by the pipe I.

If the wood to be treated is green, the moisture content may run as high as 50% in which case the comparatively free sap between the fibers is driven out but all of the moisture is not driven out. In the treatment of articles such as toilet seats where the fibre does not lie predominantly in the same direction, the articles are placed flatwise in the tank, but not wholly immersed. To impregnate blocks of wood several feet in length a deep tank is required, and the blocks can be lowered at an approximate rate of a foot in fifty minutes.

The time of immersion of a body or the rate at which the body is gradually immersed will depend on the degree of penetration or impregnation desired, the thickness of the body, the degree of fineness of its pores or interstices, the moisture content of the body, the temperature of the composition and the degree of concentration of soluble ingredients therein. By variations in these factors almost any conceivable character or degree of impregnation can be obtained.

A cardinal feature of the invention consists in the unique method of applying the composition to the articles which comprises subjecting only a portion of each article to the composition, in contradistinction to immersing the entire article, thereby affording a quicker and more thorough impregnation. This is particularly important in treating sappy wood inasmuch as the composition flows in one end and forces the sap out from the other end, whereas if the entire piece of wood were immersed the sap would be trapped and little if any impregnation would result.

The phenomenon herein disclosed I believe to be due to capillary attraction and the displacement of the sap or moisture by the composition I believe to be due to a greater capillary attraction for the composition comprising gasoline, although the high temperature of the composition hereinbefore described is important.

Another important feature of the invention consists in the unique manner of regulating the amount of impregnating component (resin and petrolatum in the stated example) deposited in the wood or other porous material which comprises substantially saturating the material with the composition before evaporating the volatile carrier and regulating the proportion of impregnating component to carrier so that when saturated with the composition the material will contain the desired amount of the impregnating component, whereby when the carrier is evaporated the desired amount of the component is deposited in the material. Heretofore it has been attempted to effect this regulation by varying the time in which the material is immersed in the composition. Owing to differences in the moisture content, porosity, and other characteristics of the different pieces of material, this known method results in irregular impregnation of the different pieces and of the different portions of individual pieces.

I claim:—

1. In impregnating porous material by filling the interstices of the material with a composition comprising an impregnating component dissolved in a volatile carrier and evaporating the volatile carrier to deposit the impregnating component in the material, the method of regulating the amount of the component deposited which comprises substantially saturating the material with the composition before evaporating the carrier and regulating the proportion of impregnating component to carrier so that when saturated with the composition the material will contain the desired amount of the impregnating component, whereby when the carrier is evaporated the desired amount of the component is deposited in the material.

2. The method of impregnating wood or other porous material composed at least in part of fibers extending predominately in the same general direction, comprising introducing the material into an unconfined body of the impregnating fluid while maintaining the aforesaid fibers substantially perpendicular to the free surface of the fluid whereby to permit the gradual impregnation of the material by capillary attraction.

3. The method of impregnating wood or other porous material composed at least in part of fibers extending predominantly in the same general direction, comprising dipping the lower end of the material into a heated and fluid body of the impregnating medium while holding the material with the aforesaid fibers substantially perpendicular to the free surface of said medium, and gradually increasing the depth of immersion of the material in the medium as impregnation progresses toward the upper end of the material.

4. That process of impregnating wood with a resinous compound which comprises dissolving such a compound in a volatile substance, heating the solution approximately to 180° F. in an open container, dipping one end only of the wood into said solution while maintaining the grain of the wood substantially perpendicular to the free surface of the solution, gradually increasing the depth of immersion of the wood as impregnation proceeds, removing the wood from the solution, and permitting the solvent to evaporate.

Signed by me at Boston, Mass., this 12th day of November, 1919.

WINTWORTH V. LANDER.